(12) United States Patent
Chuang

(10) Patent No.: US 7,661,691 B2
(45) Date of Patent: Feb. 16, 2010

(54) APPARATUS FOR ATTACHING VARIOUS ACCESSORIES TO A SEAT TUBE OF A BICYCLE

(76) Inventor: Louis Chuang, 8<sup>th</sup> Floor-4, No. 20, Ta Lon Road, Taichung (TW)

( * ) Notice: Subject to any disclaimer, the term of this patent is extended or adjusted under 35 U.S.C. 154(b) by 381 days.

(21) Appl. No.: 11/627,177

(22) Filed: Jan. 25, 2007

(65) Prior Publication Data
US 2008/0179473 A1   Jul. 31, 2008

(51) Int. Cl.
*B62J 9/00* (2006.01)
(52) U.S. Cl. .................. 280/288.4; 280/292; 280/304.5
(58) Field of Classification Search ................ 248/207; 24/502, 522; 280/288.4, 292, 304.5
See application file for complete search history.

(56) References Cited

U.S. PATENT DOCUMENTS

| | | | |
|---|---|---|---|
| 5,127,562 A * | 7/1992 | Zane et al. .................. 224/446 |
| 5,386,961 A * | 2/1995 | Lu .......................... 248/223.41 |
| 5,669,536 A * | 9/1997 | Wang ........................... 224/443 |
| 5,931,361 A * | 8/1999 | Schwimmer ................. 224/453 |
| 6,398,247 B1 * | 6/2002 | Kuo .......................... 280/288.4 |
| 6,554,307 B1 * | 4/2003 | Ockenden ................... 280/204 |
| 6,971,564 B2 * | 12/2005 | Yang ........................... 224/425 |
| 7,273,221 B2 * | 9/2007 | Ockenden ................. 280/288.4 |
| 2002/0096858 A1 * | 7/2002 | Shaw ......................... 280/293 |

* cited by examiner

*Primary Examiner*—Tony H. Winner
*Assistant Examiner*—Maurice Williams
(74) *Attorney, Agent, or Firm*—Alan Kamrath; Kamrath & Associates PA

(57) ABSTRACT

An apparatus for detachably connecting a selected one of various accessories to a bicycle includes a receptacle, an insert and a fastening device. The receptacle is connected to the bicycle. The insert is connected to the selected accessory so that the selected accessory is detachably connected to the bicycle when the insert is inserted in the receptacle. The fastening device is used to keep the insert in the receptacle.

14 Claims, 21 Drawing Sheets

APPARATUS FOR ATTACHING VARIOUS ACCESSORIES TO A SEAT TUBE OF A BICYCLE

BACKGROUND OF INVENTION

1. Field of Invention

The present invention relates to a bicycle and, more particularly, to an apparatus for attaching various accessories to a seat tube of a bicycle.

2. Related Prior Art

Referring to FIGS. 21 and 22, there is shown a conventional apparatus for attaching a luggage carrier 80 to a seat tube 90 of a bicycle. The apparatus includes a dovetail 81 formed on the luggage carrier 80 and a dovetail groove 91 defined in a pocket 94 formed on the seat tube 90. The dovetail 81 is inserted in the dovetail groove 91 while a lower end 82 of the dovetail 81 is limited by a closed end 92 of the dovetail groove 91. A bolt 85 is driven in a screw hole 83 defined in the dovetail 81 and a screw hole 93 defined in the pocket 94. Thus, the luggage carrier 80 is firmly connected to the seat tube 90. Problems have, however, been encountered during the fabrication and use of the apparatus. Firstly, it requires precision to make the screw hole 83 corresponding to the screw hole 93. Otherwise, it will be troublesome to align the screw hole 83 with the screw hole 93 before the driving of the bolt 85 therein. Secondly, making of the screw hole 83 in the dovetail 81 inevitably jeopardizes the strength of the dovetail 81.

The present invention is therefore intended to obviate or at least alleviate the problems encountered in the prior art.

SUMMARY OF INVENTION

According to the present invention, an apparatus is disclosed for detachably connecting a selected one of various accessories to a bicycle. The apparatus includes a receptacle, an insert and a fastening device. The receptacle is connected to the bicycle. The insert is connected to the selected accessory so that the selected accessory is detachably connected to the bicycle when the insert is inserted in the receptacle. The fastening device is used to keep the insert in the receptacle.

An advantage of the apparatus of the present invention is easy operation for using the fastening device.

Another advantage of the apparatus of the present invention is a strong structure.

Still another advantage of the apparatus of the present invention is a low cost.

Other advantages and features of the present invention will become apparent from the following description referring to the drawings.

BRIEF DESCRIPTION OF DRAWINGS

The present invention will be described via detailed illustration of embodiments referring to the drawings.

DETAILED DESCRIPTION OF EMBODIMENTS

Figure 1:
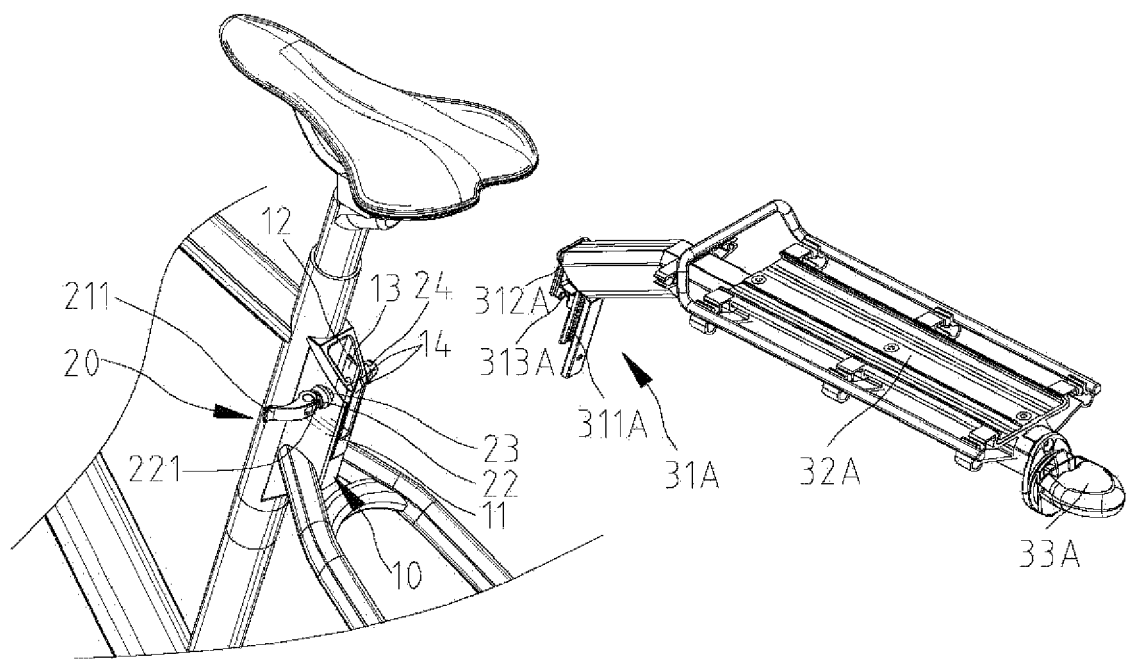
FIG. 1 is a perspective view of a luggage carrier before attachment to a seat tube by an apparatus according to a first embodiment of the present invention.

Referring to FIG. 1, a luggage carrier 32A can be attached to a seat tube by an apparatus according to a first embodiment of the present invention. A tail light 33A is attached to the luggage carrier 32A.

The apparatus includes a receptacle 10, a fastening device 20 and an insert 31A. The receptacle 10 is formed on or secured to the seat tube. The insert 31A is formed on or secured to the luggage carrier 32A. The insert 31A can be inserted in the receptacle 10 so that the luggage carrier 32A can be detachably connected to the seat tube. The fastening device 20 is preferably a quick release for keeping the insert 31A in the receptacle 10 so that the attachment of the luggage carrier 32A to the seat tube is firm.

The insert 31A includes two grooves 311A, a recess 313A in an end and a rail 312A on each side.

Figure 2:
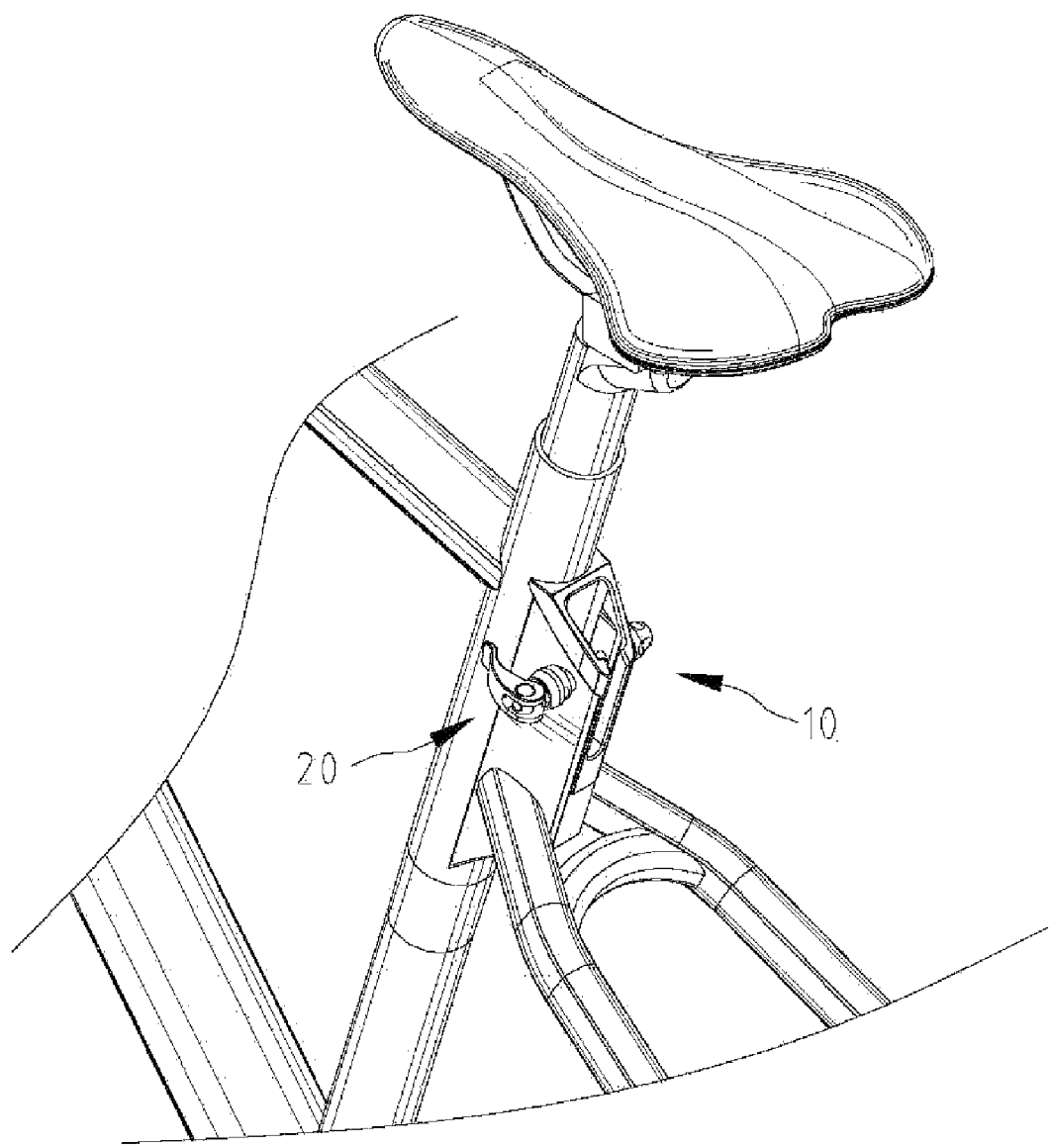
FIG. 2 is an enlarged view of a portion of the apparatus of FIG. 1.
Figure 3:
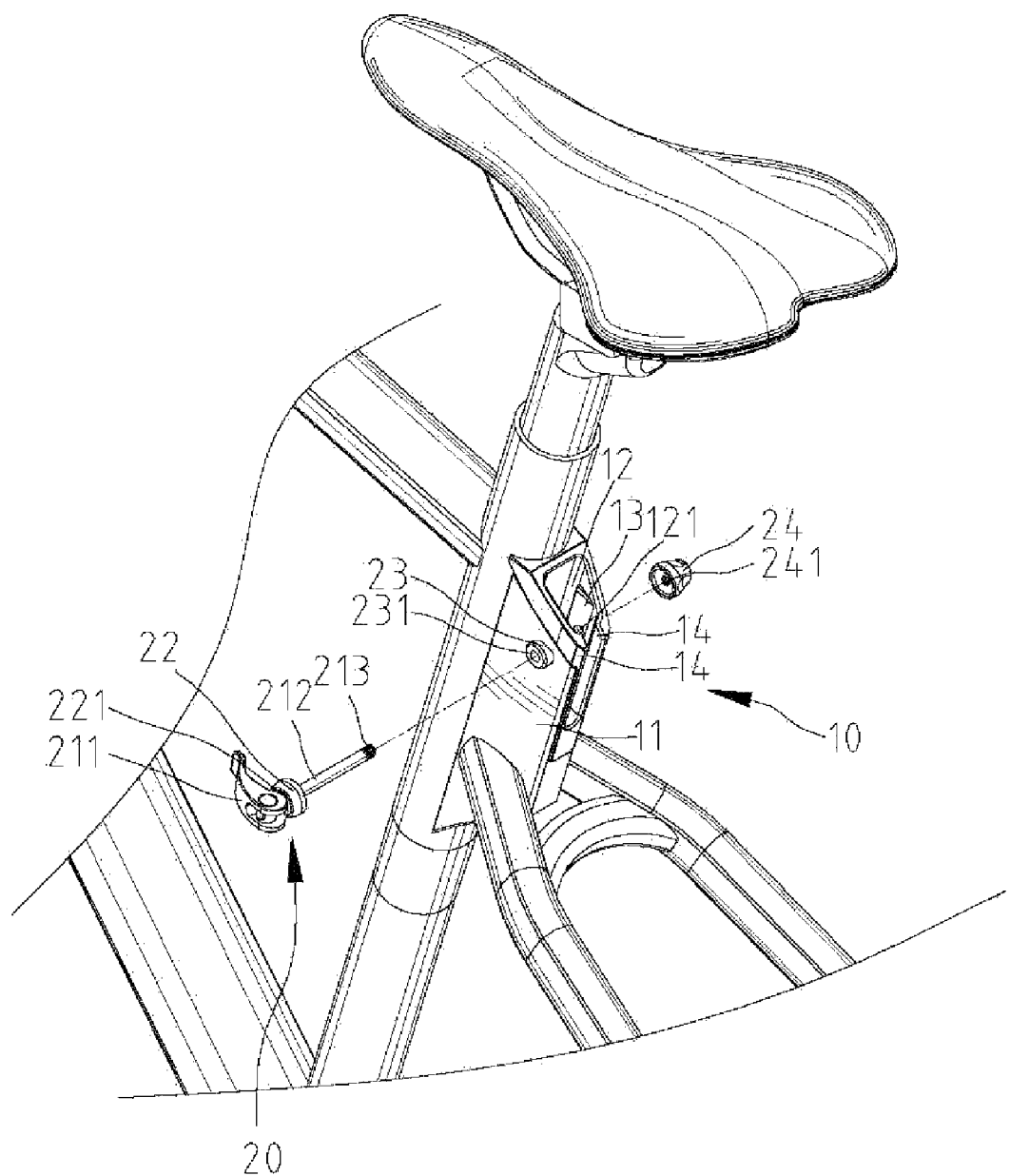
FIG. 3 is an exploded view of the portion of the apparatus shown in FIG. 2.
Figure 4:
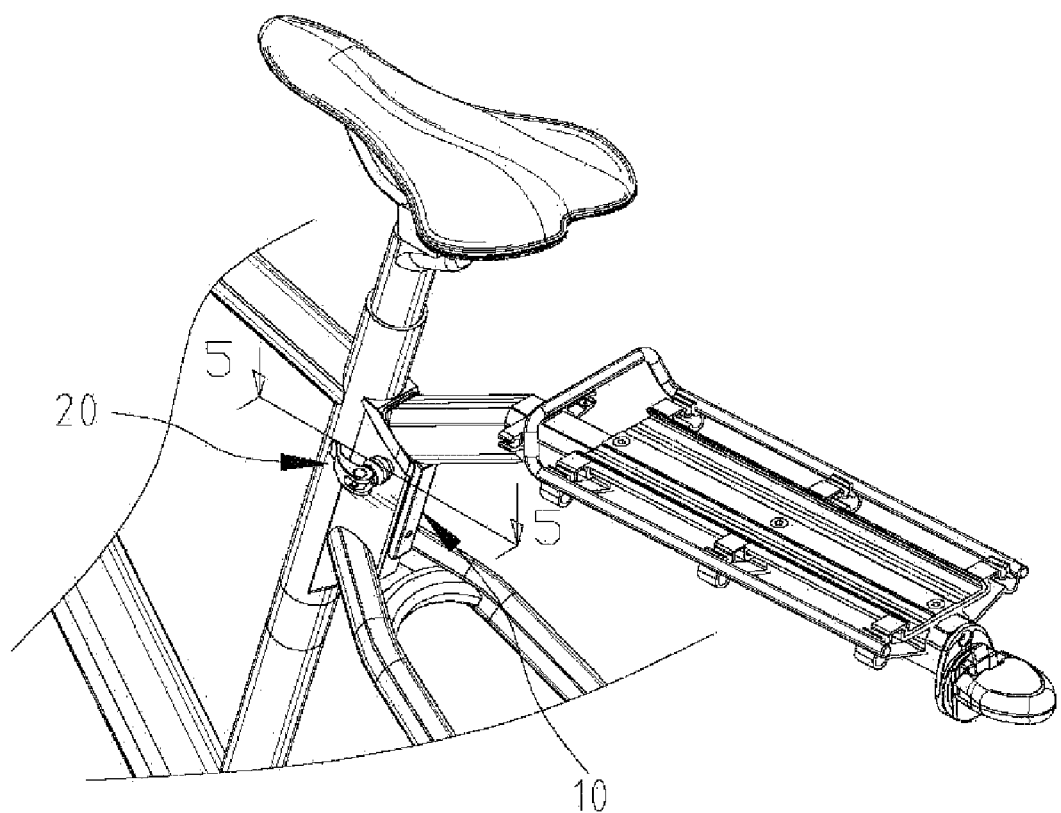
FIG. 4 is a perspective view of the luggage carrier attached to the seat tube by the apparatus shown in FIG. 1.

Referring to FIGS. 2 and 3, the receptacle 10 includes two walls 11, a groove 12 in each of the walls 11, a rail 14 on each of the walls 11, a space 13 between the walls 11 and an aperture 111, 121 in each of the walls 11. The space 13 is open on the top and on a side. A washer 23 is attached to each of the walls 11 and has an apertura 231.

The fastening device 20 includes a bolt 212, a thread 213 on the bolt 212, a collar 22 on the bolt 212, a tightening element 211 pivotally connected to the bolt 212 and a nut 24 engaged with the bolt 212. The collar 22 includes a concave side. The tightening element 211 includes a cam 221 and a lever extending from the cam 221. The cam 221 of the tightening element 211 is pivotally disposed against the concave side of the collar 22. The nut 24 defines a screw hole 241 for receiving the thread 213.

Figure 5:
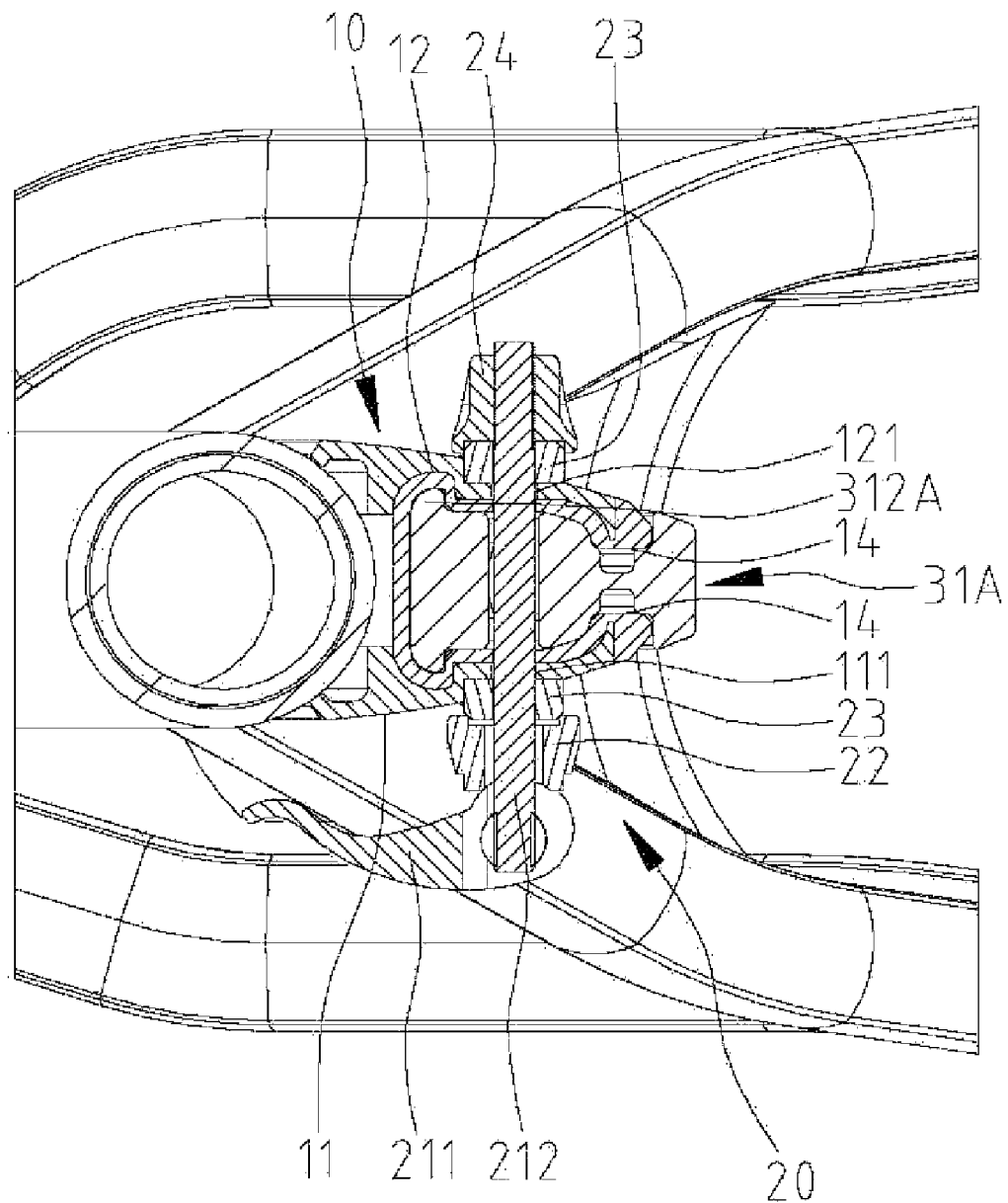
FIG. 5 is a cross-sectional view taken along a line 5-5 shown in FIG. 4.

Referring to FIG. 5, the insert 31A is inserted in the receptacle 10. The rails 312A are inserted in the grooves 12. The grooves 311A receive the rails 14. The recess 313A receives the bolt 212. The bolt 212 is inserted in the washers 23 and the apertures 231 of the walls 11. The bolt 212 is engaged with the nut 24. By pivoting the lever of the tightening element 211 to a first position, the cam of the tightening element 211 moves the collar 22 towards the nut 24. Thus, the walls 11 clamp the insert 31A.

Figure 6:
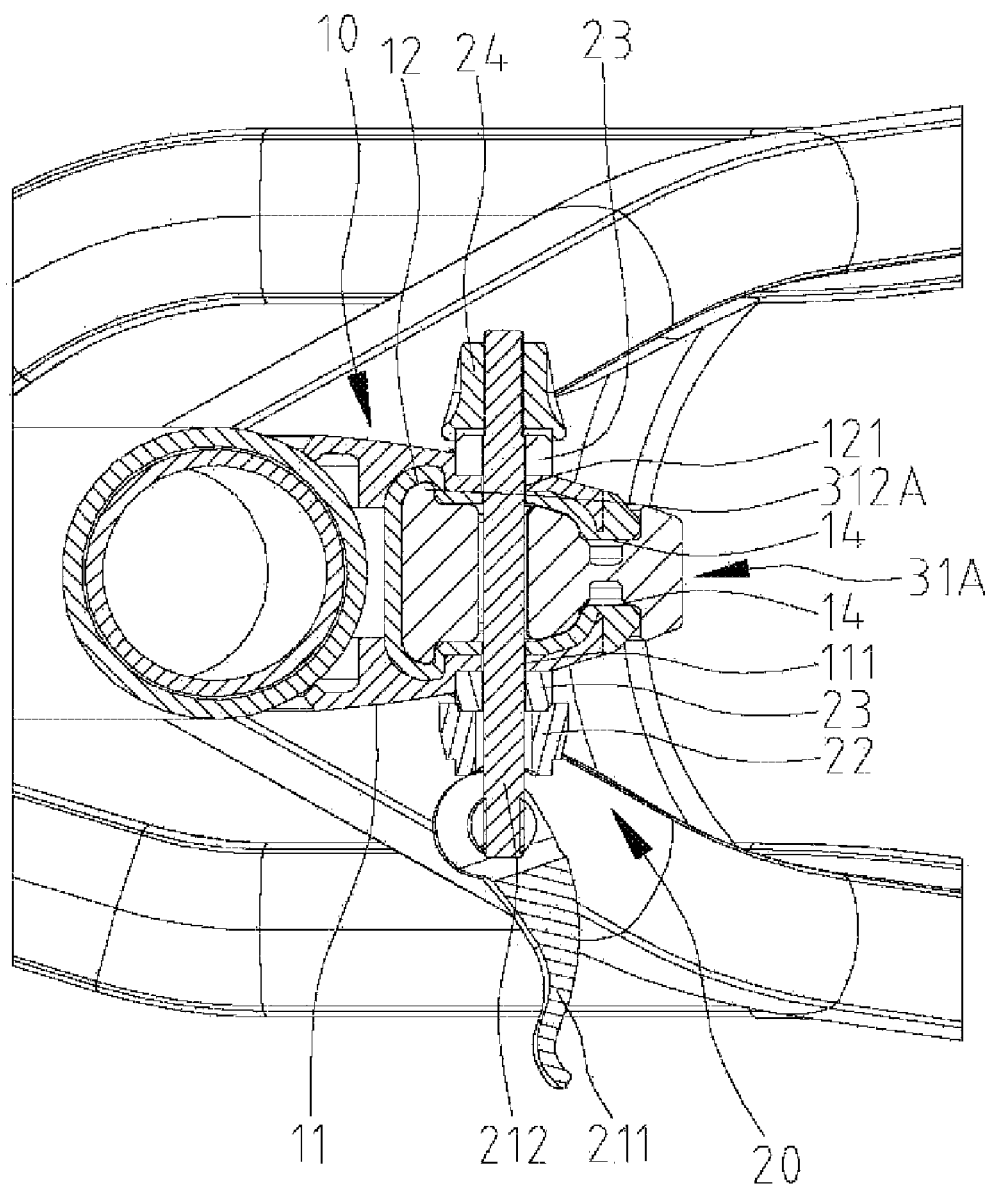
FIG. 6 is a cross-sectional view of the apparatus in another position than shown in FIG. 5.

Referring to FIG. 6, by pivoting the lever of the tightening element 211 to a second position, the cam of the tightening element 211 allows the collar 22 and the nut 24 to release the walls 11 that in turn release the insert 31A.

Figure 7:
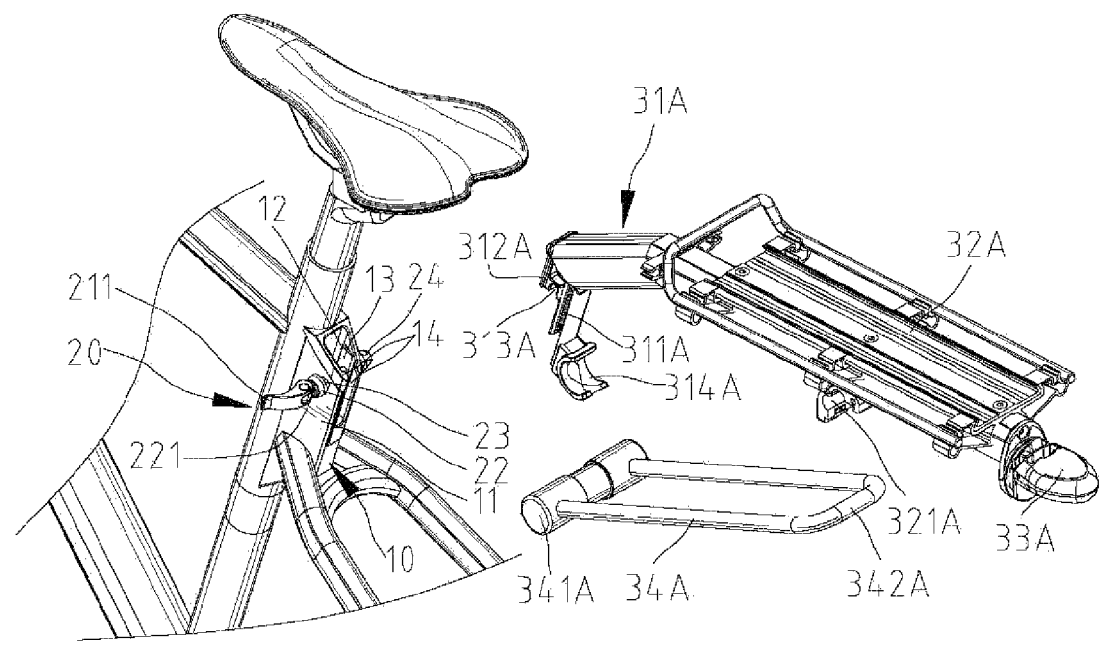
FIG. 7 is a perspective view of another luggage carrier before attachment to the seat tube by the apparatus shown in FIG. 1.
Figure 8:
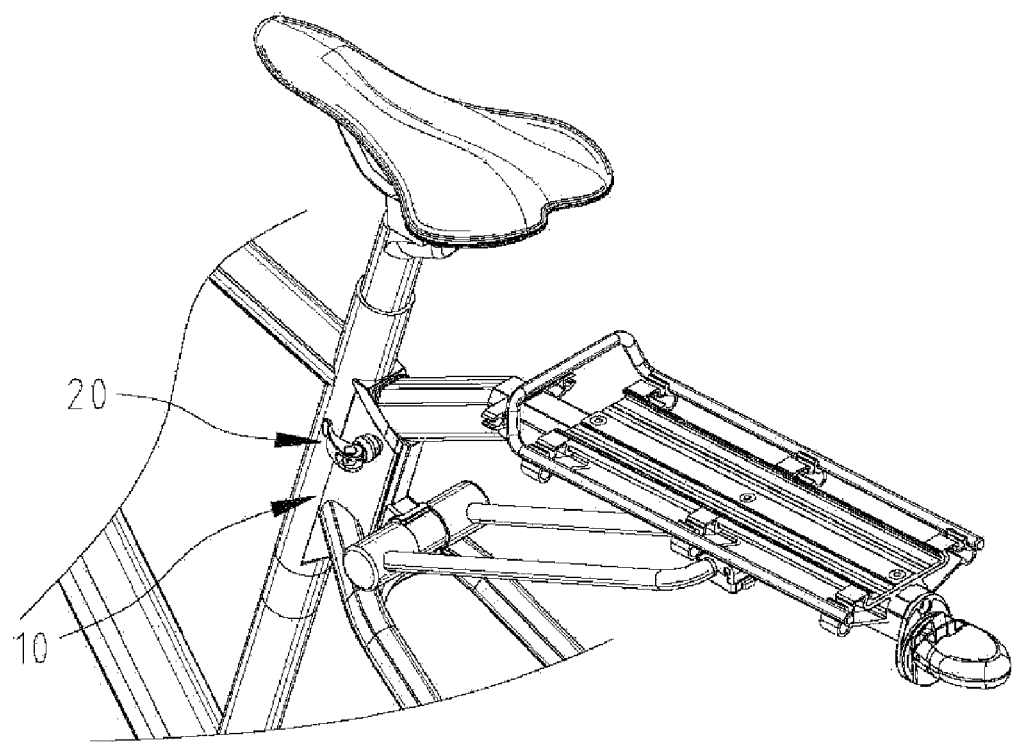
FIG. 8 is a perspective view of the luggage carrier attached to the seat tube by the apparatus shown in FIG. 7.
Figure 9:
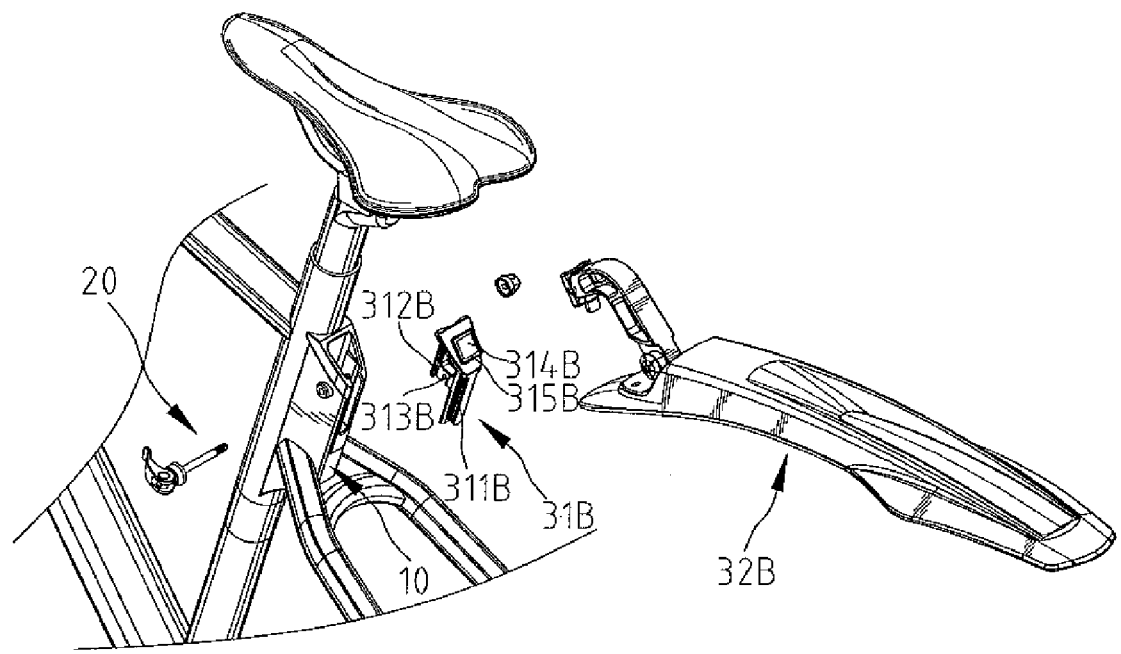
FIG. 9 is a perspective view of a mudguard before attachment to the seat tube by the apparatus shown in FIG. 1.
Figure 10:
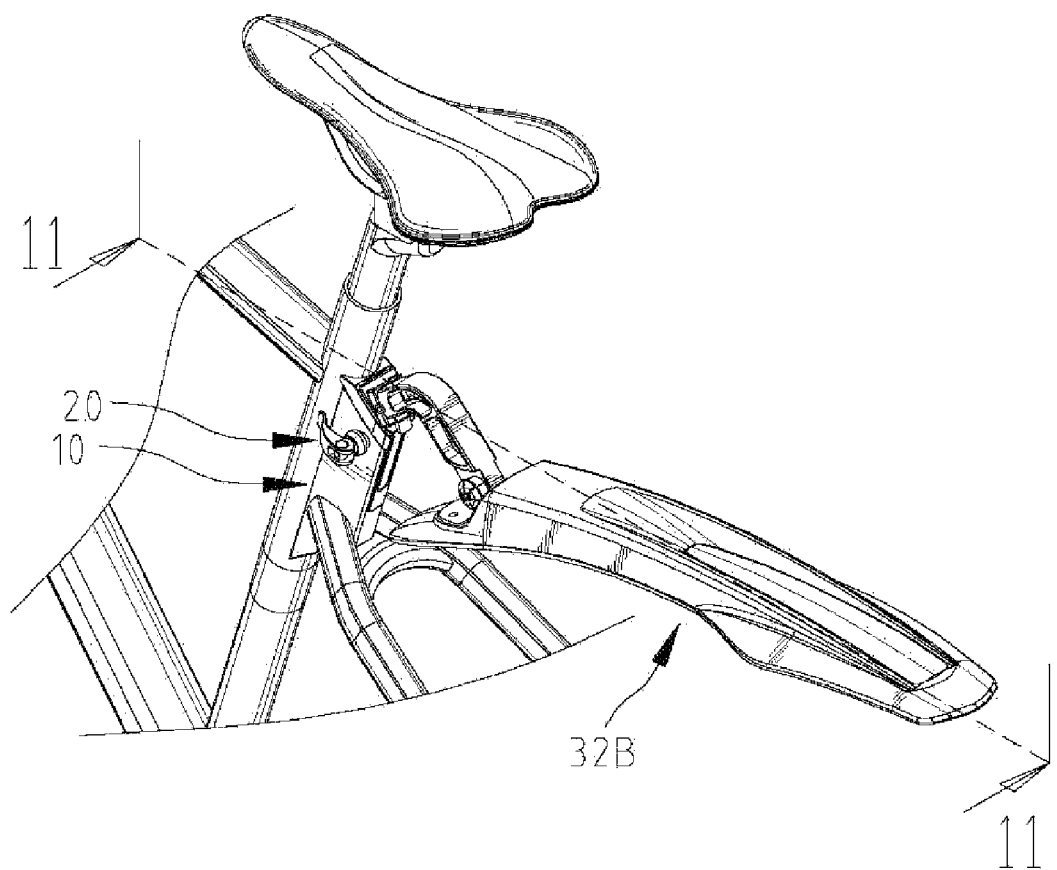
FIG. 10 is a perspective view of the mudguard attached to the seat tube by the apparatus shown in FIG. 9.
Figure 11:
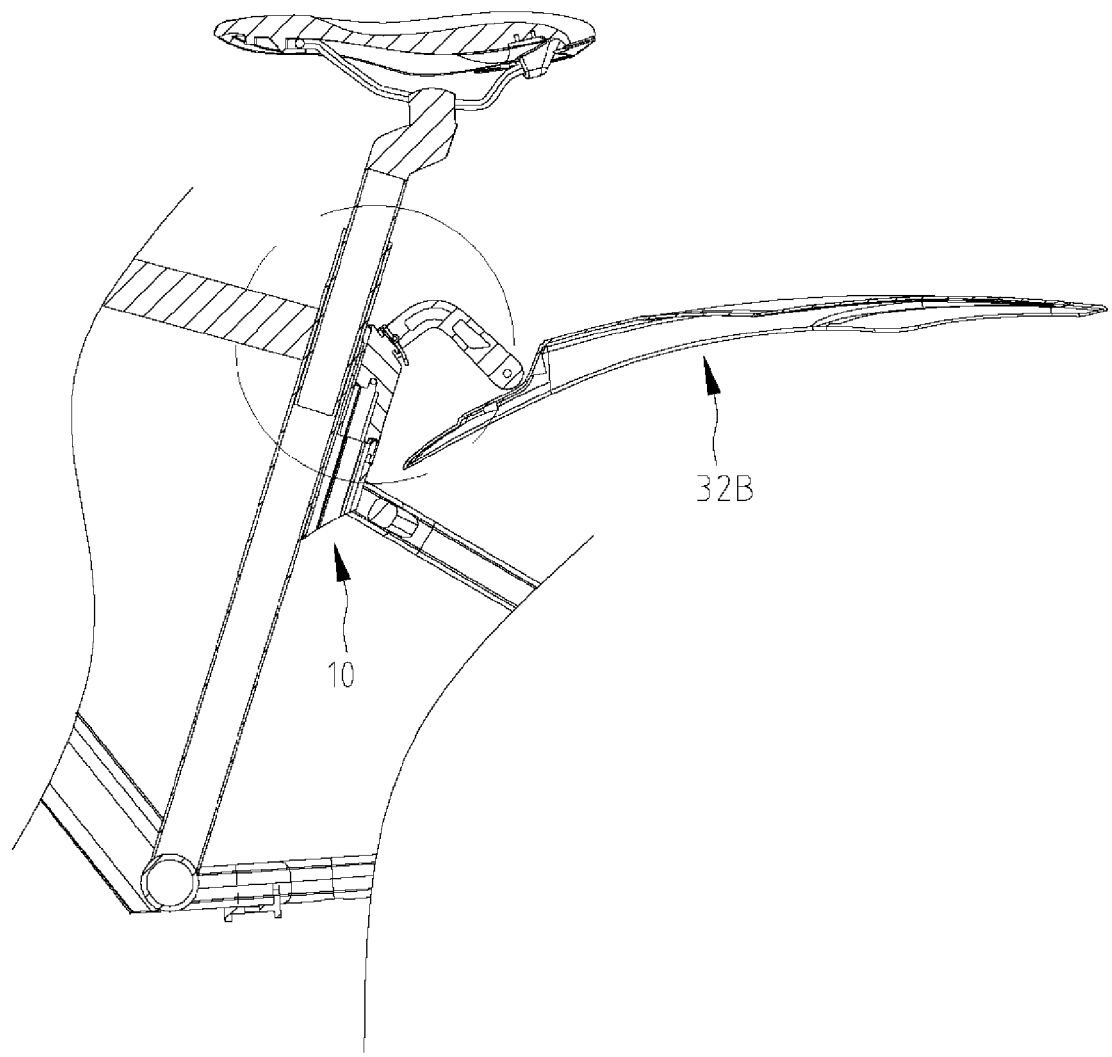
FIG. 11 is a cross-sectional view taken along a line 11-11 shown in FIG. 10.
Figure 12:
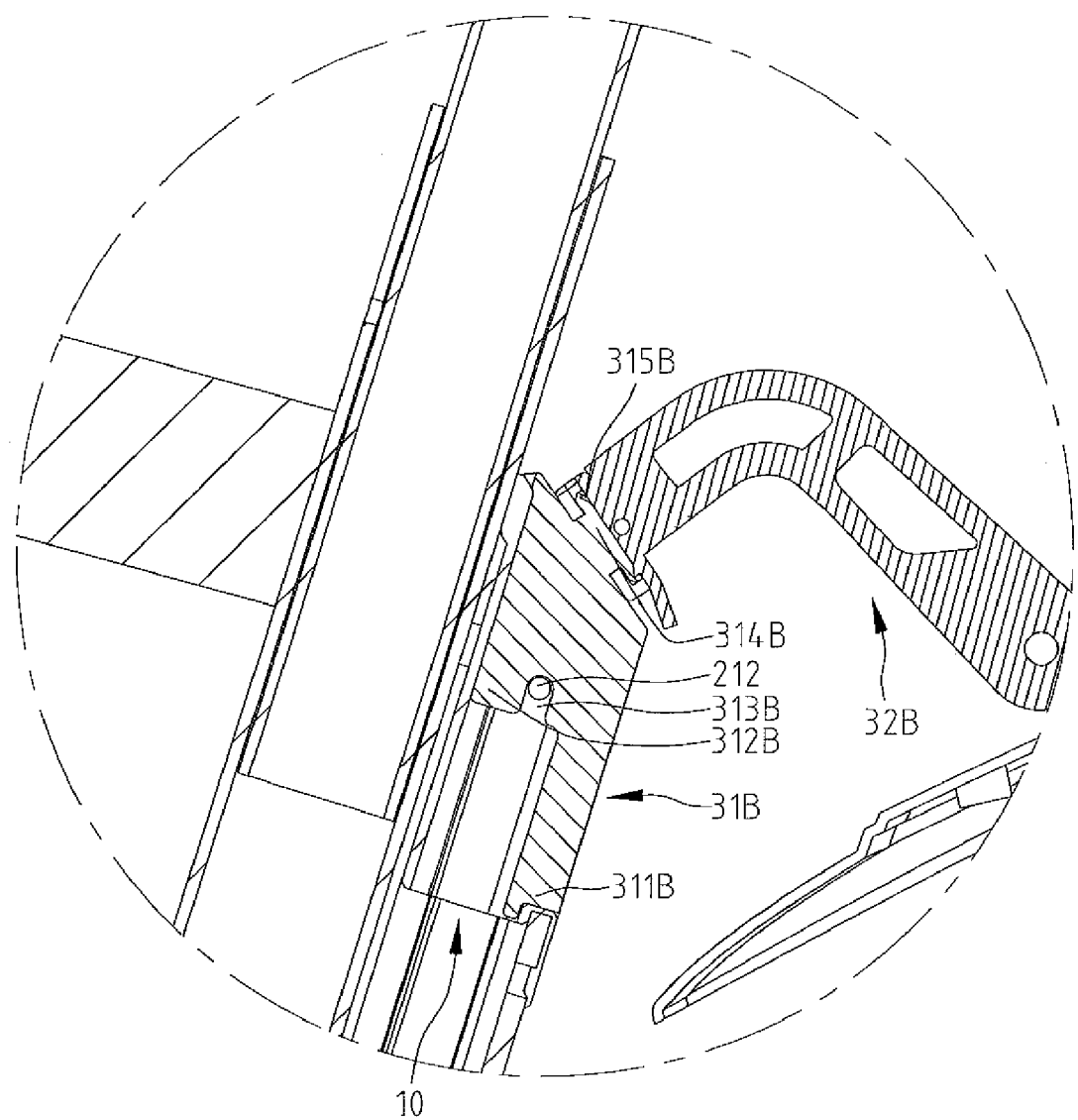
FIG. 12 is an enlarged partial view of the apparatus shown in FIG. 11.

Referring to FIGS. 7 and 8, there is shown a lock 34A including a body 341A and a shackle 342A. To carry the lock 34A, the insert 31A is formed with a claw 314A for holding the body 341A while the luggage carrier 32A is formed with a claw 321A for holding the shackle 342A.

Referring to FIGS. 9 through 12, there is shown an insert 31B and a mudguard 32B. The insert 31B is not formed on nor secured to the mudguard 32B. Instead, the insert 31B is detachably connected to the mudguard 32B. The insert 31B includes two grooves 311B, two rails 312B and a recess 313B like the grooves 311A, the rails 312A and the recess 313A of the insert 31A. Additionally, the insert 31B includes a block 314B defining two grooves 315B.

Figure 13:
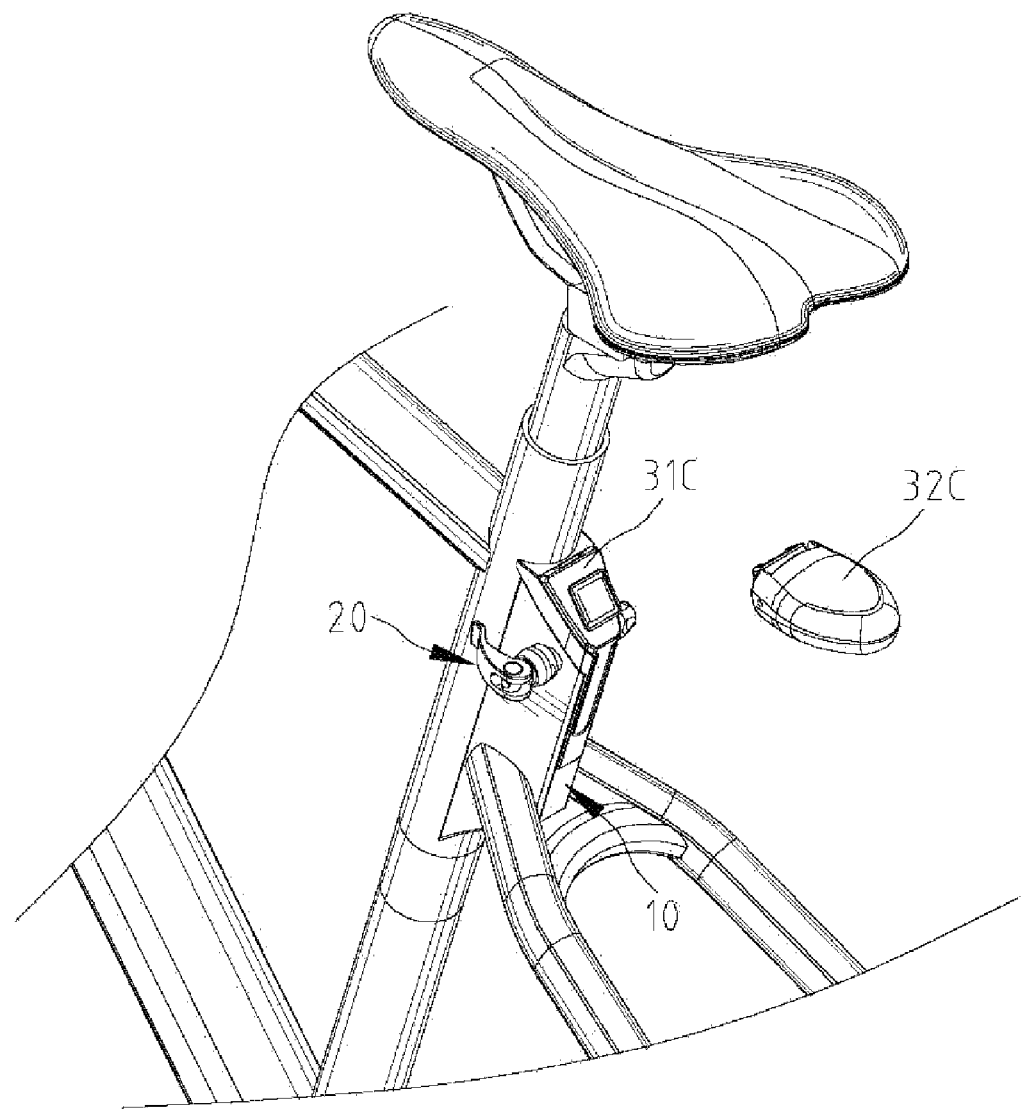
FIG. 13 is a perspective view of a tail light before attachment to the seat tube shown in FIG. 1.
Figure 14:
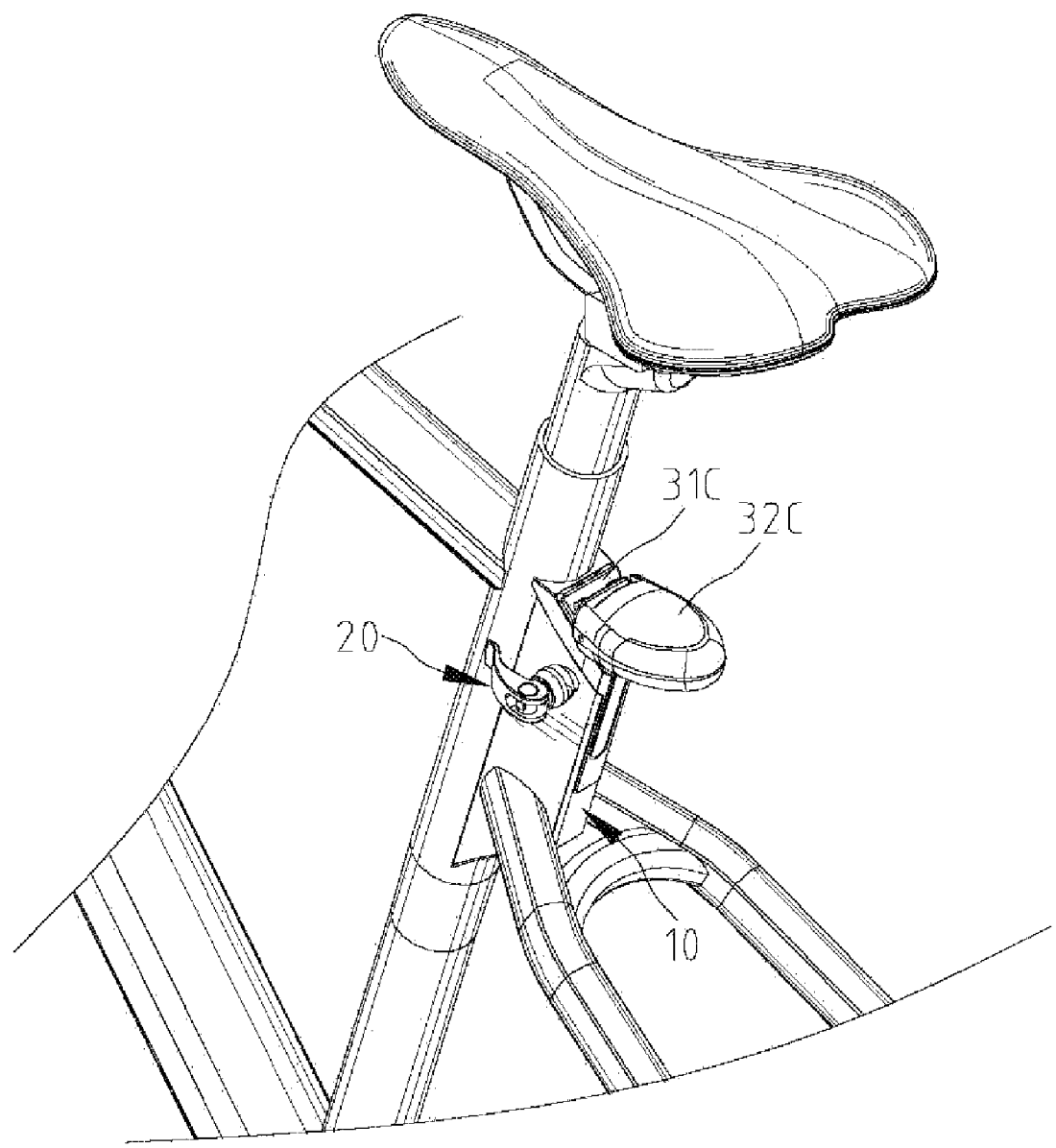
FIG. 14 is a perspective view of the tail light attached to the seat tube shown in FIG. 13.
Figure 15:
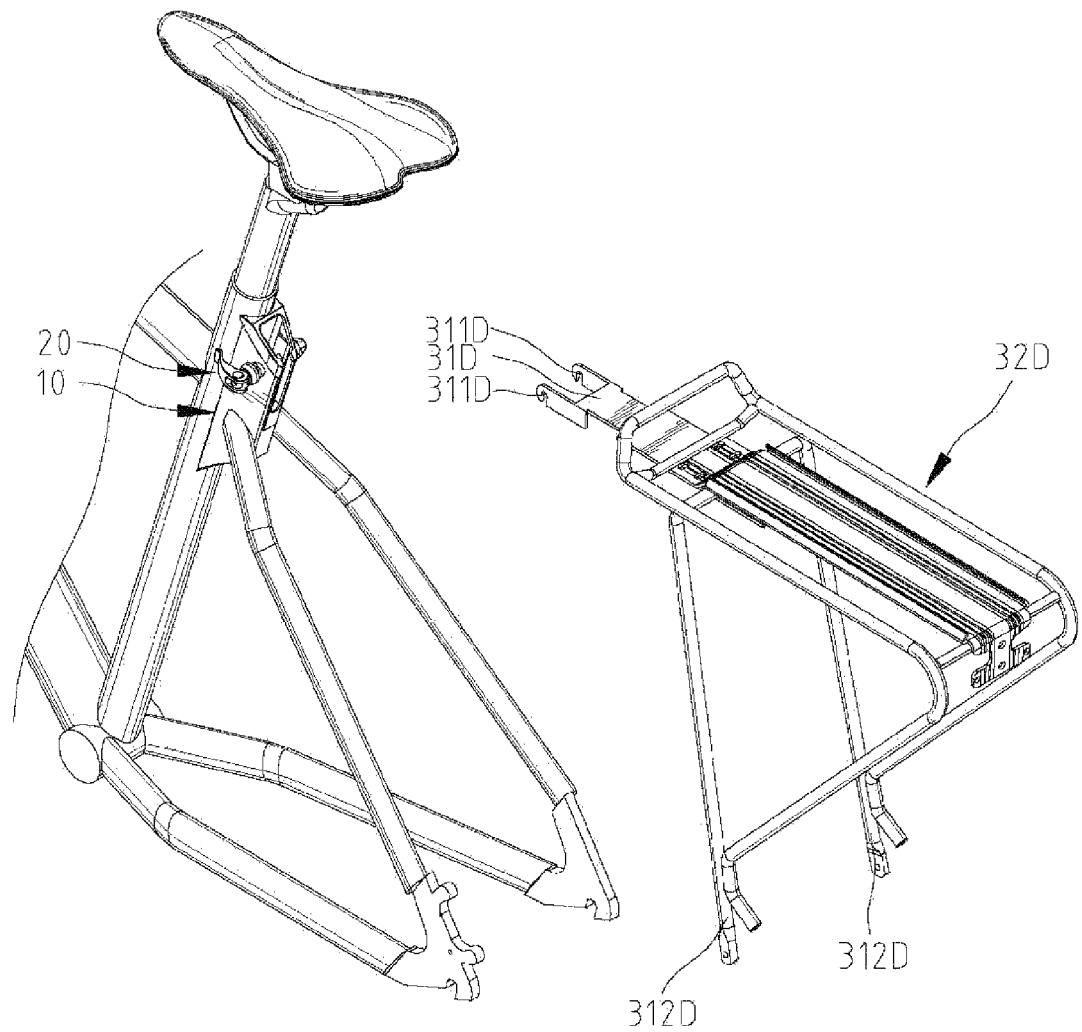
FIG. 15 is a perspective view of a luggage carrier before attachment to a seat tube by an apparatus according to a second embodiment of the present invention.
Figure 16:
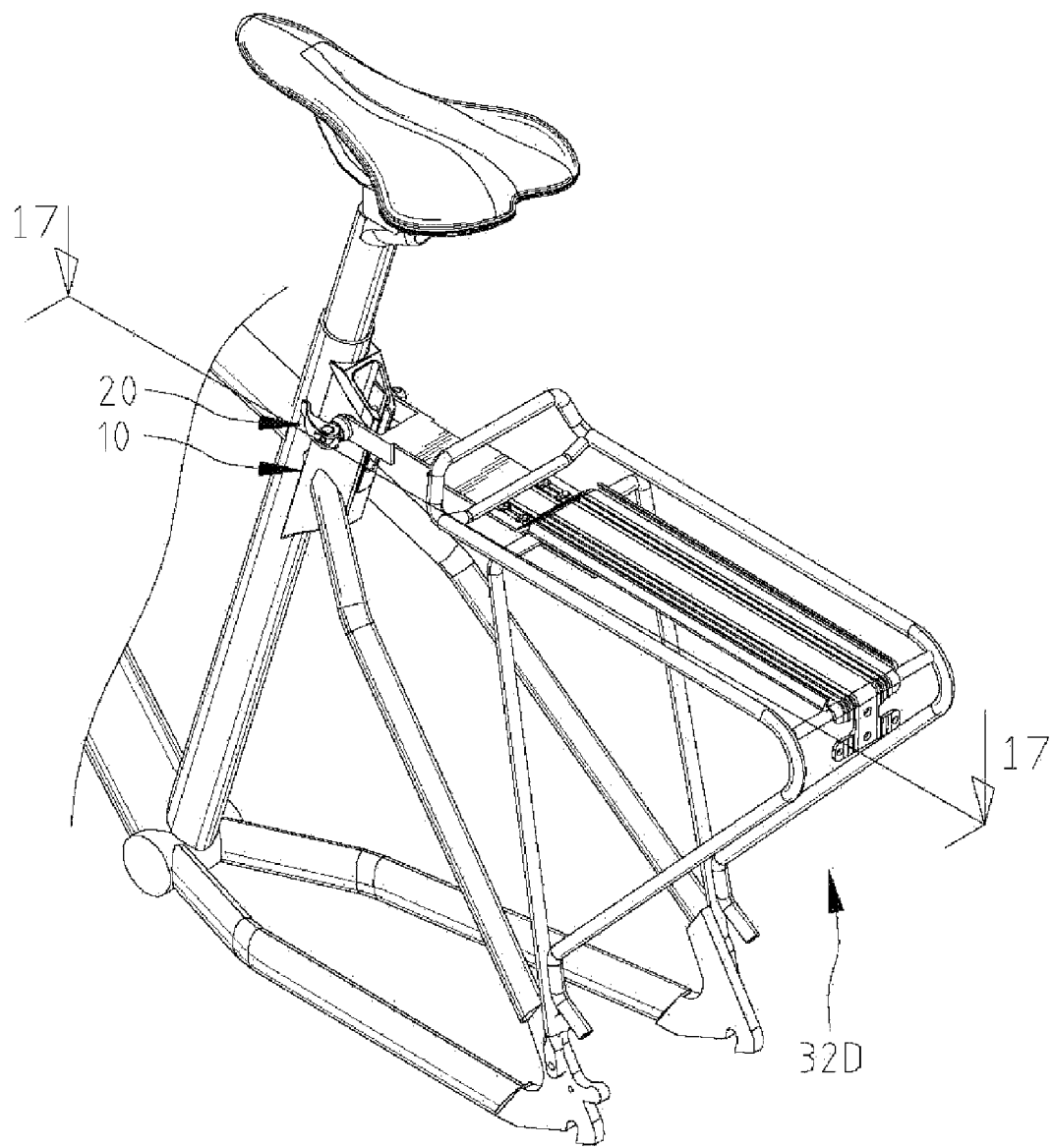
FIG. 16 is a perspective view of the luggage carrier attached to the seat tube by the apparatus shown in FIG. 15.
Figure 17:
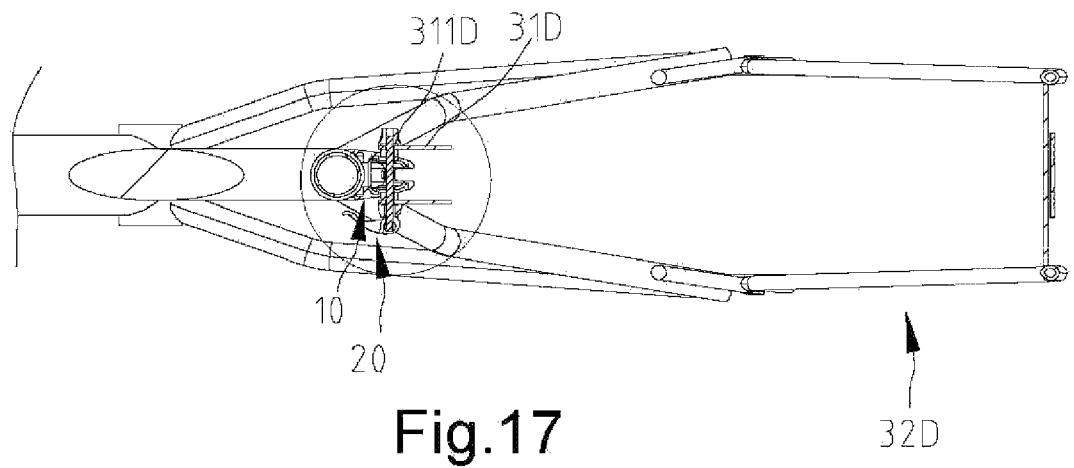
FIG. 17 is a cross-sectional view taken along a line 17-17 shown in FIG. 16.
Figure 18:
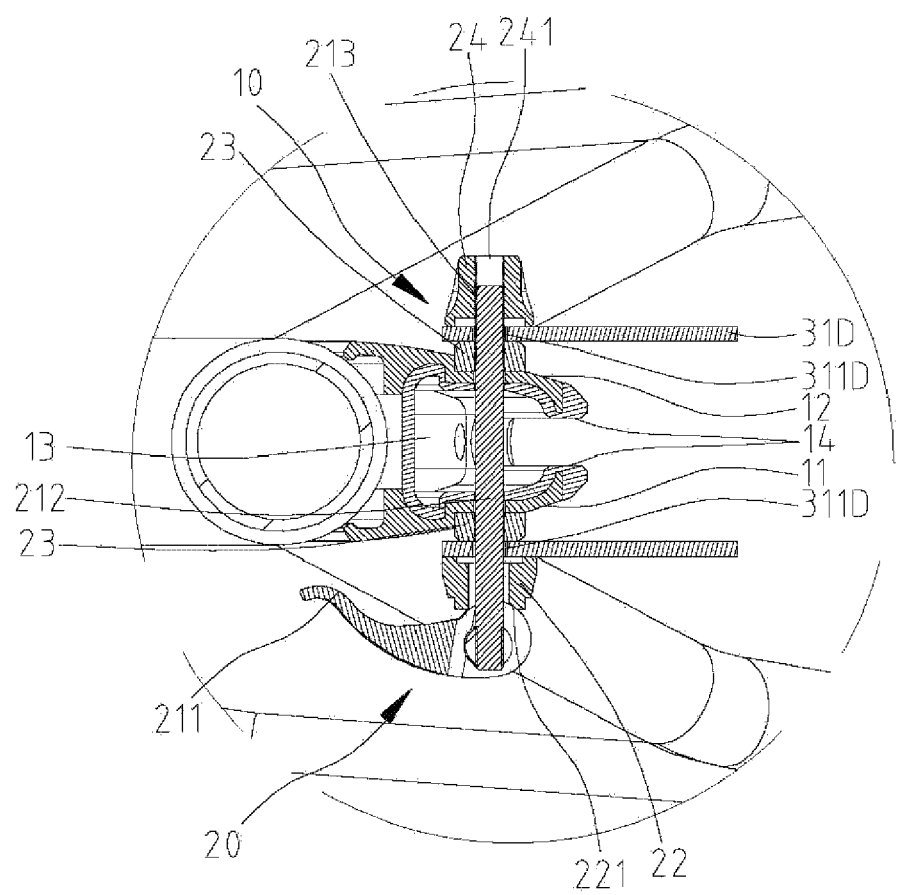
FIG. 18 is an enlarged partial view of the apparatus shown in FIG. 17.

Referring to FIGS. 13 and 14, a tail light 32C is detachably connected to an insert 31C. The connection of the tail light 32C to the insert 31C is like that of the mudguard 32B to the insert 31B and, therefore, will not be described in detail.

Referring to FIGS. 15 to 18, an apparatus according to a second embodiment of the present invention includes the receptacle 10, the fastening device 20 and a hooking device 31D formed on or secured to a luggage carrier 32D. The hooking device 31D includes two hooks 311D for hooking the bolt 212. The luggage carrier 32D is formed with two legs 312D connected to chain stays or two prongs of a rear fork.

Figure 19:
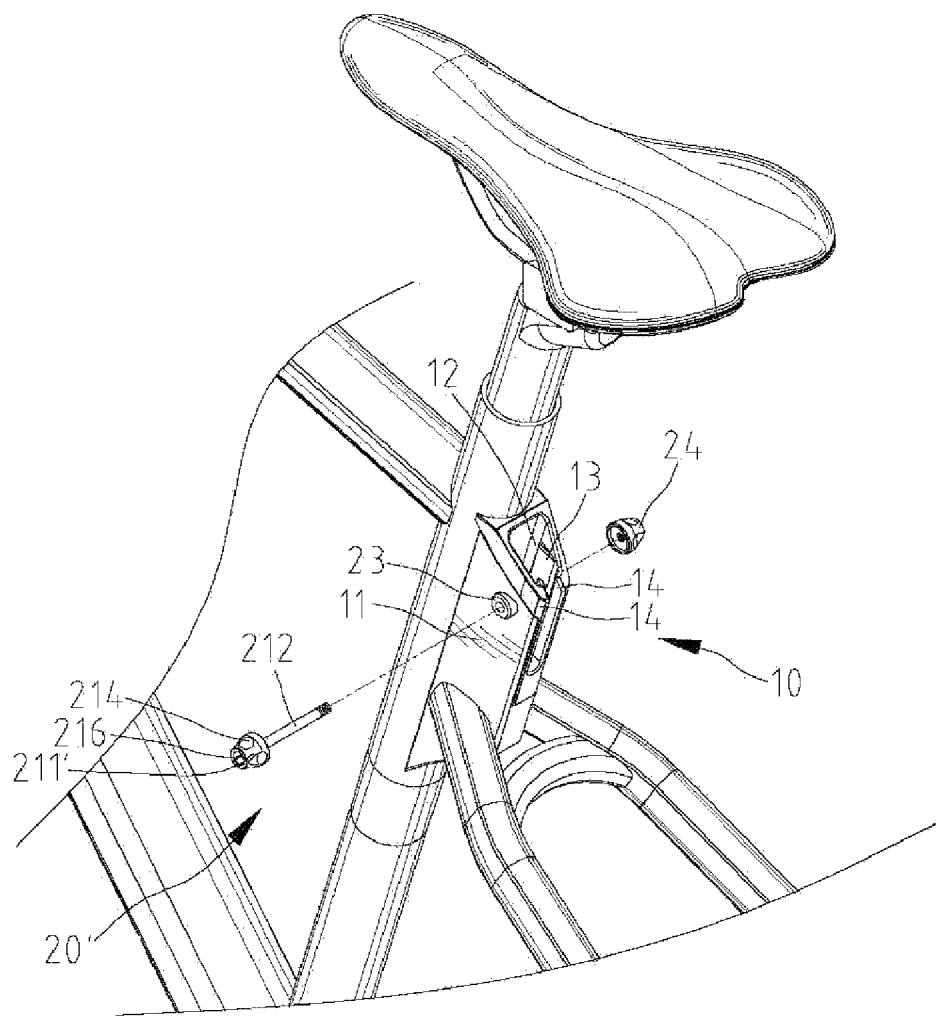
FIG. 19 is an exploded partial view of an apparatus according to a third embodiment of the present invention.
Figure 20:
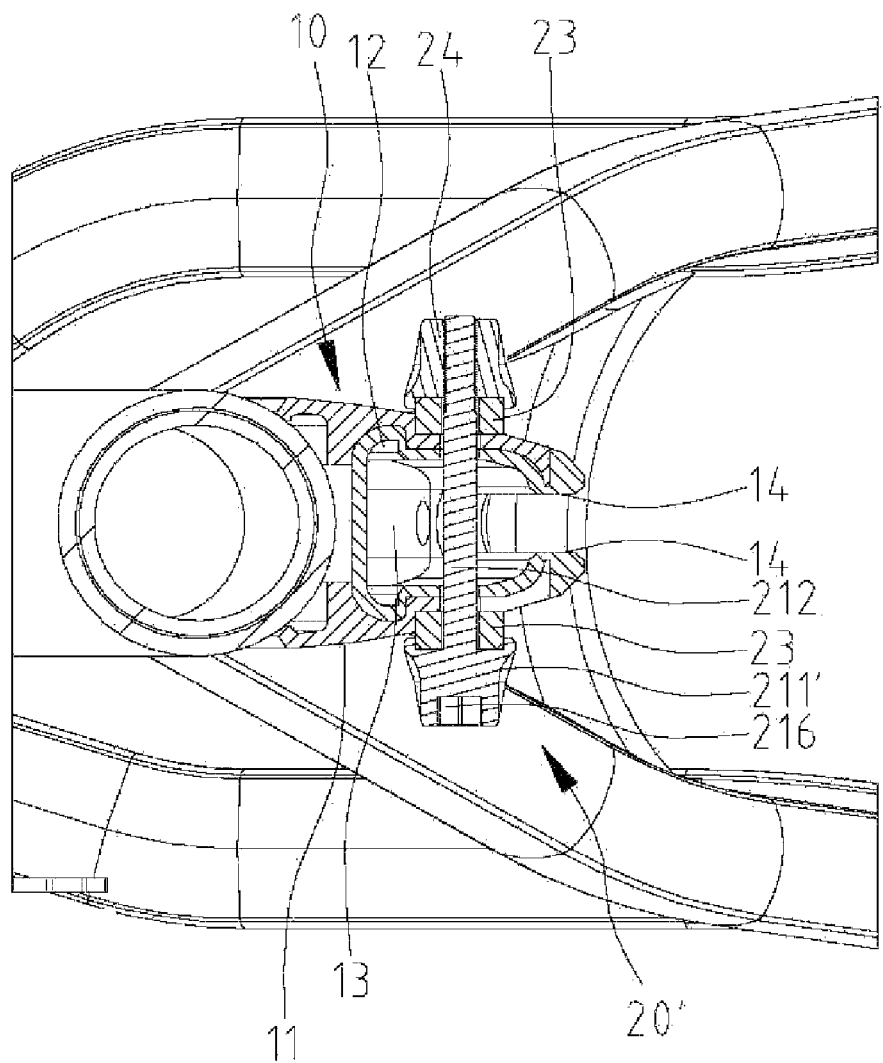
FIG. 20 is a cross-sectional view of the apparatus shown in FIG. 19.
Figure 21:
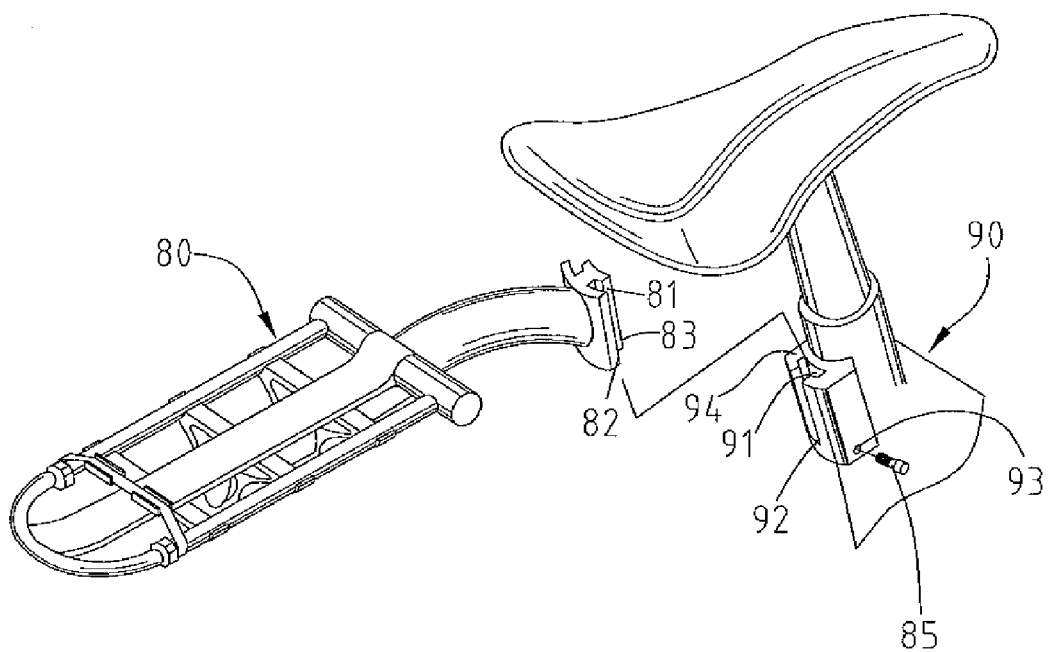
FIG. 21 is an exploded view of a conventional apparatus for attaching a luggage carrier to a seat tube.
Figure 22:
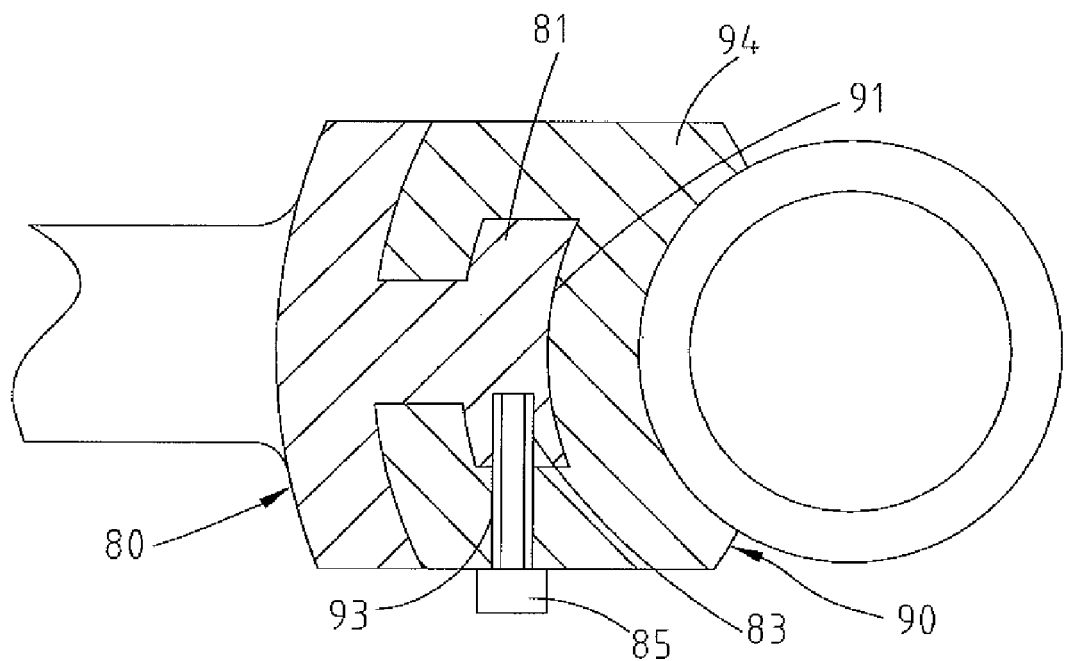
FIG. 22 is an enlarged cross-sectional view of the conventional apparatus shown in FIG. 21.

Referring to FIGS. 19 and 20, there is shown an apparatus according to a third embodiment of the present invention. The third embodiment is like the first embodiment except including a fastening device 20' instead of the fastening device 20. The fastening device 20' is like the fastening device 20 except including a knob 211' instead of the tightening element 211. The knob 211' is formed on the bolt 212. The knob 211' includes skid-proof portions 214 for facilitating the turning thereof. The knob 211' defines a recess 216 for receiving a key for the turning thereof.

The apparatus of the present invention exhibits several advantages. Firstly, its operation is easy for using the fastening device. Secondly, its structure is strong. Thirdly, its cost is low.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. An apparatus for detachably connecting a selected one of various accessories to a bicycle, the apparatus comprising:
   a receptacle connected to the bicycle and formed with two walls, with a space defined between the two walls, with an aperture in each of the two walls;
   an insert connected to the selected accessory, with the insert slideably disposed in the space between the two walls, with the selected accessory detachably connected to the bicycle when the insert is detachably disposed between the two walls of the receptacle; and
   a fastening device causing the two walls of the receptacle to clamp the insert in the space, with the fastening device including a bolt extending through the apertures in the two walls and the space, with the insert including a recess slideably receiving the bolt extending through the space when the insert is slideably received in the space, with the recess slideable from the bolt extending through the space and the apertures in the two walls.

2. The apparatus according to claim 1 wherein the fastening device is a quick release.

3. The apparatus according to claim 1 wherein the fastening device comprises a nut engaged with the bolt and a knob formed on the bolt for facilitating the turning of the bolt.

4. The apparatus according to claim 3 wherein the knob comprises skid-proof portions for facilitating the turning thereof.

5. The apparatus according to claim 3 wherein the knob defines a recess for receiving a key for facilitating the turning thereof.

6. The apparatus according to claim 1 wherein the receptacle comprises a rail on each of the two walls, and wherein the insert defines two grooves for receiving the rails.

7. The apparatus according to claim 1 wherein the receptacle comprises a groove in each of the two walls and wherein the insert comprises two rails for insertion in the grooves.

8. The apparatus according to claim 1 wherein the fastening device comprises a nut engaged with the bolt.

9. The apparatus according to claim 8 wherein the receptacle defines the apertures of the two walls through which the bolt is inserted.

10. The apparatus according to claim 1 wherein the accessories comprise a luggage carrier.

11. The apparatus according to claim 1 wherein the accessories comprise a light.

12. The apparatus according to claim 1 wherein the accessories comprise a lock.

13. The apparatus according to claim 1 wherein the accessories comprise a mudguard.

14. The apparatus according to claim 1 wherein the fastening device further comprises:
   a nut engaged with the bolt, a collar on the bolt and a tightening element pushing the collar towards the nut; and
   a hooking device comprising two hooks for hooking the bolt so that one of the hooks is sandwiched by the nut and the bicycle while the other hook is sandwiched by the collar and the bicycle.

* * * * *